United States Patent
Kawasaki

(10) Patent No.: US 7,707,325 B2
(45) Date of Patent: Apr. 27, 2010

(54) JOB STATUS MONITORING SYSTEM, JOB STATUS MONITORING METHOD, PROGRAM, AND STORAGE MEDIUM

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 11/425,671

(22) Filed: Jun. 21, 2006

(65) Prior Publication Data
US 2007/0008579 A1    Jan. 11, 2007

(30) Foreign Application Priority Data
Jun. 28, 2005    (JP) .............................. 2005-188290

(51) Int. Cl.
  *G06F 3/00* (2006.01)
  *H04N 1/00* (2006.01)
(52) U.S. Cl. .................. 710/15; 710/18; 358/426.02; 358/426.1
(58) Field of Classification Search .................. 710/15, 710/18; 358/426.02, 426.1
See application file for complete search history.

(56) References Cited

U.S. PATENT DOCUMENTS

| | | | | |
|---|---|---|---|---|
| 5,323,393 A | * | 6/1994 | Barrett et al. ............... | 370/449 |
| 6,055,361 A | * | 4/2000 | Fujita et al. ................. | 358/1.15 |
| 7,106,465 B1 | * | 9/2006 | Simpson et al. ............. | 358/1.15 |
| 7,117,222 B2 | * | 10/2006 | Santosuosso ................ | 707/101 |
| 2004/0046986 A1 | * | 3/2004 | Kuwabara et al. ........... | 358/1.14 |
| 2004/0165029 A1 | * | 8/2004 | Park ........................... | 347/23 |
| 2005/0053402 A1 | * | 3/2005 | Ishii ............................ | 400/62 |
| 2005/0213115 A1 | * | 9/2005 | Johnson et al. .............. | 358/1.1 |

FOREIGN PATENT DOCUMENTS

| | | | |
|---|---|---|---|
| EP | 685768 A1 | * | 12/1995 |
| JP | 2000-242443 A | | 9/2000 |

* cited by examiner

*Primary Examiner*—Niketa I Patel
*Assistant Examiner*—Farley J Abad
(74) *Attorney, Agent, or Firm*—Canon USA Inc. IP Division

(57) ABSTRACT

A job status monitoring system includes a job output unit configured to output a job to a job managing unit of an operating system. The job is issued in response to a job issue request. A status of the job output to a printer is monitored by a monitoring unit. The monitoring unit controls the job managing unit by monitoring the status of the job. An application or utility determines the status of the job by obtaining information about the job from the job managing unit and performs display control based on the determined status of the job.

13 Claims, 12 Drawing Sheets

JOB STATUS MONITORING SYSTEM, JOB STATUS MONITORING METHOD, PROGRAM, AND STORAGE MEDIUM

BACKGROUND OF THE INVENTION

1. Field of the Invention

The present invention relates to a technique of monitoring jobs (e.g., print jobs and maintenance jobs) executed in a printer.

2. Description of the Related Art

In conventional printing systems, a print job is typically generated by a host computer, the generated print job is output to a printer, and print data is recorded on a paper medium by the printer.

In such printing systems, a user can determine whether a generated print job has been transferred to the printer by viewing a graphical user interface of a print queue provided in WINDOWS.RTM. by Microsoft Corporation.

In one conventional method of monitoring information about a job in a print queue, a host module (e.g., application) may be used to readily monitor a job status. However, such method may be insufficient in terms of accuracy. For example, the end of a job in the print queue in the operating system may not synchronize with the end of an actual print process performed by the printer. To overcome this problem, Japanese Patent Laid-Open No. 2000-242443 discloses a job monitoring technique using a language monitor.

The flowchart shown in FIG. 13 illustrates a job monitoring process using the language monitor. In the illustrated job monitoring process, a job is issued in step S1301. Then, a status display application is started in step S1302. Of course, the application may be started before step S1301. The language monitor monitors a status of a printer and transmits a result of the monitoring to the status display application. The status display application inputs the transmitted information in step S1303, and determines data to be displayed on the basis of the input information in step S1304.

However, the following disadvantages may occur when a print job is monitored through the communication between a monitoring unit such as the language monitor and the application. That is, the application may be required to have a function of identifying various output results from the language monitor, necessitating an increase in the complexity of the application program.

SUMMARY OF THE INVENTION

Accordingly, embodiments of the present invention are conceived as a response to the above-described disadvantages of the conventional methods.

According to one aspect of the present invention, there is provided a job status monitoring system capable of communicating with a printer. The job status monitoring system includes a job output unit configured to output a job to a job managing unit of an operating system. The job is issued in response to a job issue request. A status of the job output to the printer is monitored by a monitoring unit. The monitoring unit controls the job managing unit by monitoring the status of the job. An application or utility recognizes the status of the job managed by the job managing unit and performs display control based on the status of the job recognized by the application or utility.

According to another aspect of the present invention, a job status monitoring system includes a job output unit configured to output a job and a dummy job to a job managing unit of an operating system. The job is issued in response to a job issue request. The dummy job does not affecting a print output process. An application or utility recognizes a status of the dummy job managed by the job managing unit and performs display control based on the recognized status of the dummy job.

According to yet another aspect of the present invention, a job status monitoring system includes a job output unit configured to output a job to a job managing unit of an operating system. The job is issued in response to a job issue request and is attached to a dummy job having a size that is larger than a printer buffer of the printer. An application or utility recognizes a status of the dummy job managed by the job managing unit and performs display control based on the recognized status of the dummy job.

According to a further aspect of the present invention, a method for monitoring a job status is provided. The method includes outputting a job to a job managing unit of an operating system. The job is issued in response to a job issue request. The method further includes monitoring a status of the job output to a printer, and controlling the job managing unit based on the monitoring of the status of the job. An application or utility recognizes the status of the job managed by the job managing unit based on information about the job obtained from the job managing unit and performs display control based on the status of the job recognized by the application or utility.

According to a further aspect of the present invention, a method for monitoring a job status is provided. The method includes outputting a job and a dummy job to a job managing unit of an operating system. The job is issued in response to a job issue request. The dummy job does not affecting a print output process. An application or utility recognizes a status of the dummy job managed by the job managing unit and performs display control based on the recognized status of the dummy job.

According to a further aspect of the present invention, a computer-readable medium has instructions stored thereon which, when executed by a computer, causes the computer to perform a method including outputting a job to a job managing unit of an operating system, monitoring a status of the job output to a printer, and controlling the job managing unit based on the monitored status of the job. An application or utility recognizes the status of the job managed by the job managing unit based on information about the job obtained from the job managing unit and performs display control based on the status of the job recognized by the application or utility.

Other features and aspects of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
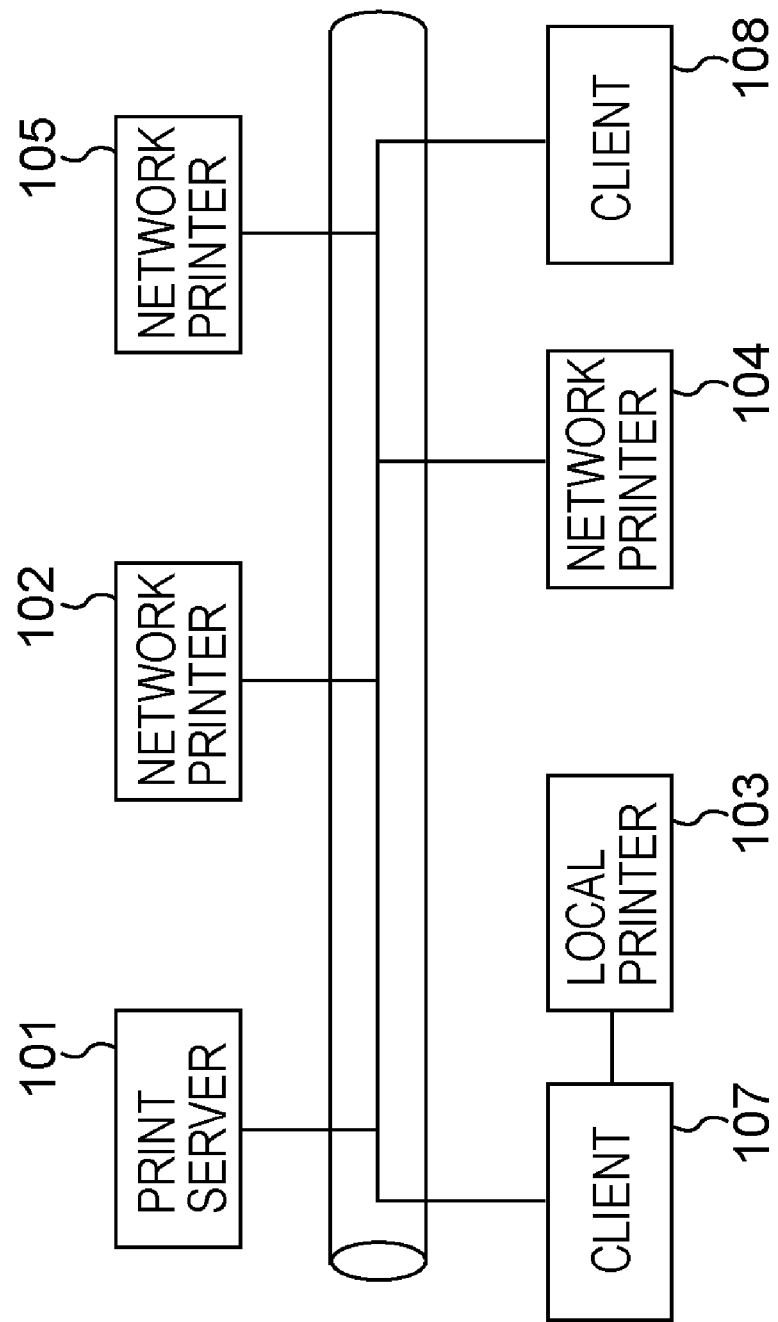
FIG. 1 is a block diagram of an exemplary printing system according to embodiments of the present invention.

FIG. 1 shows an example of a configuration of a printing system according to embodiments of the present invention. In FIG. 1, a plurality of client apparatuses are connected to a network.

More specifically, client apparatuses 107 and 108 are connected to the network through network cables and are capable of executing various programs including an application program.

A print server 101 allows computers (e.g., client apparatuses 107 and 108) on the network to share printers connected to the network, so that the printers can be used by external apparatuses. Even if the print server 101 is not provided, a network printer or a printer connected to the client can be allowed to perform printing through the network.

Each of the client apparatuses 107 and 108 may comprise a personal computer (PC), which is an example of an information processing apparatus employed by the printing system. These client apparatuses and network printers are connected to the network.

The illustrated printing system also includes network printers 102, 104, and 105 and a local printer 103. Each client apparatus can allow the network printer 102, 104, or 105, or the local printer connected to the client apparatus or to another client apparatus on the network to perform printing. Embodiments of the present invention can be applied to a combination between any client apparatus and any printer, for example, as shown in FIG. 1.

<Example of Hardware Configuration of Network Computer>

Figure 2:
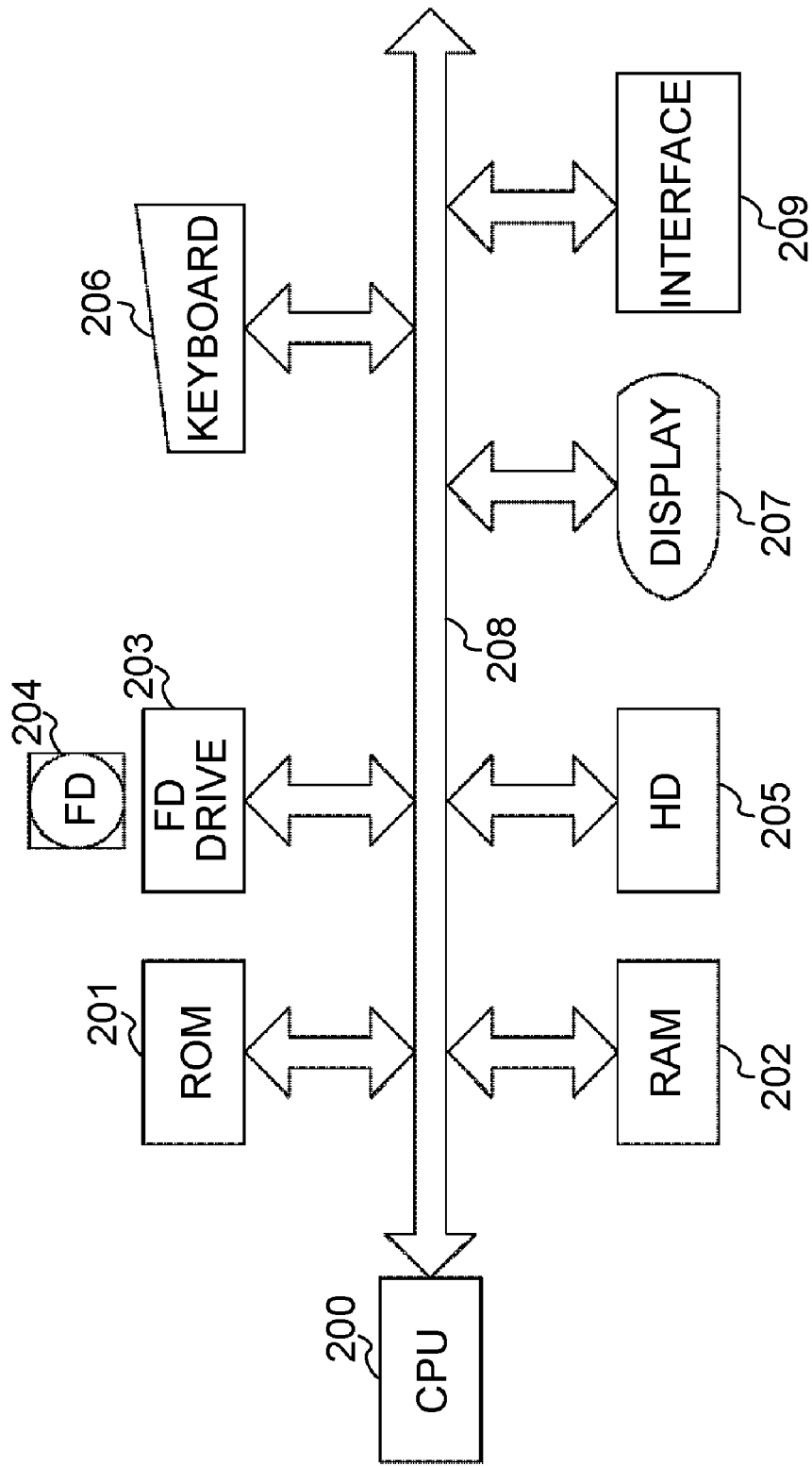
FIG. 2 is a block diagram of an example of a hardware configuration of a computer according to embodiments of the present invention.

FIG. 2 illustrates an example of a hardware configuration of a computer (e.g., the print server 101 and the client apparatuses 107 and 108) according to embodiments of the present invention.

In FIG. 2, a CPU (central processing unit) 200 controls components of the apparatus. The CPU 200 is capable of executing any suitable computer programs, including an application program, a printer driver program, an OS (operating system), and a network printer control program of an embodiment. These programs may be stored in a HD (hard disk) 205. Also, the CPU 200 is capable of executing programs and/or functions to control temporarily storing of information and files required to execute a program in a RAM (random access memory) 202.

A ROM (read only memory) 201 functions as a storage unit and stores programs including a basic I/O program, font data used to process documents, and data for templates. The RAM 202 is a temporal storage unit and functions as a main memory or a work area of the CPU 200.

An FD (flexible disk) drive 203 functions as a storage medium reading unit and is capable of loading programs and the like stored in an FD 204 to the computer. The FD 204 is a storage medium storing computer-readable programs. Storage media other than the FD may also be used, for example, a CD-ROM (compact disc read only memory), a CD-R (compact disc recordable), a CD-RW (compact disc rewritable), a PC card, a DVD (digital versatile disc), an IC (integrated circuit) memory card, an MO (magneto-optical disc), and a memory stick.

The HD 205 is one of external storage units and functions as a mass storage memory. The HD 205 stores an application program, a printer driver program, an OS, a network printer control program, a related program, and so on.

A keyboard 206 functions as an instructions input unit and is used by a user to input a device control command to the client computer or by an operator or administrator to input a device control command to the print server. A display 207 functions as a display unit and displays a command input through the keyboard 206 or a status of a printer.

A system bus 208 controls a flow of data in the computer. An interface 209 functions as an input/output unit. The computer transmits/receives data to/from an external apparatus via the interface 209.

Figure 3:
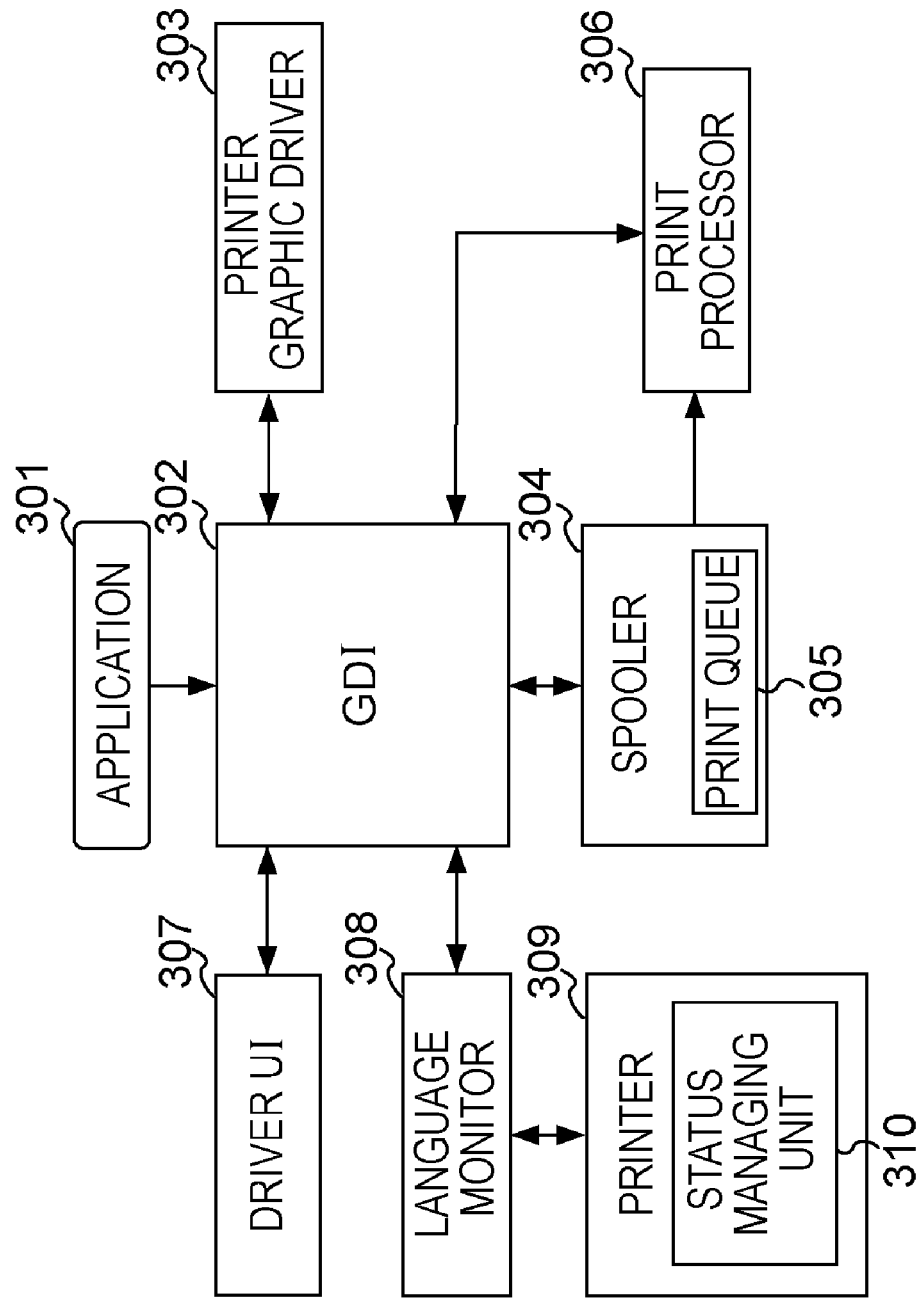
FIG. 3 is a block diagram of an exemplary software module configuration of a client apparatus according to embodiments of the present invention.

FIG. 3 illustrates an exemplary software configuration of a client apparatus in communication with a printer according to embodiments of the present invention.

In the example shown in FIG. 3, WIINDOWS.RTM. by Microsoft Corporation is used as an operating system (OS) in a personal computer (corresponding to the information processing apparatus and client apparatus of embodiments of the present invention). Nevertheless, it is understood that embodiments of the present invention are not limited for use with any one specific operating system and any suitable operating system may be employed. An application 301 having a printing function has been installed in the client apparatus. A printer 309 is connected to the client apparatus (computer). The printer 309 corresponds to the network printer 102 or 105 or the local printer 103 shown in FIG. 1. The printer 309 includes a status managing unit 310 to detect a status of the printer 309 and to detect a status of an input job and output the detected status to an external apparatus. The status managing unit 310 includes a status detecting sensor, a memory, a status analyzing unit, and a communication unit.

Hereinafter, each software block is described.

Rendering data (print data, such as document data or image data) requested to be printed via the application 301 is transmitted to a printer graphic driver 303 as a job output unit via a GDI (graphics device interface) 302, which is a rendering module of the OS. The printer graphic driver 303 generates a print job on the basis of the received data. The generated print job is output as a print request to the printer 309.

The GDI 302 according to an embodiment temporarily spools the output data as EMF (enhanced meta file) data. The spooled data is then transmitted to a spooler 304 having a job managing function configured by a module of the OS. The spooler 304 holds and manages information about the received job until the job ends (e.g., completes). More specifically, the size and name of each print job are managed for each printer and are displayed in a print queue 305. Optionally, the job itself including rendering data may be held until the job ends in case of an error, such as paper jam.

After the spooler 304 has received spool data, the subsequent process is performed independently from the process of the application. After the spooling, a print request is issued to a print processor 306.

On the basis of the issued print request, the print processor 306 reads print output information and rendering data from the spooler 304 in units of pages and outputs the data one page by one to the printer graphic driver 303 via the GDI 302 so as to print the data. The print processor 306 is provided as a module of the OS, but may be customized by a printer vender or the like.

The printer graphic driver 303, which has received the print request from the print processor 306, renders the rendering data into raster image data in accordance with the print resolution of the printer by using a GDI rendering engine, which is a rendering function of the GDI 302. Then, the printer graphic driver 303 performs color processing and addition of a printer command so as to generate a print job and outputs the print job to the printer 309.

Actually, the data output from the printer graphic driver 303 is transmitted as a transmission request to a language monitor 308 via the GDI 302.

The language monitor 308 divides the print job into packets, each having a predetermined size, and sequentially outputs the packets to the printer 309.

The language monitor 308 is capable of obtaining information about various statuses of the printer and statuses of a job input to the printer. The job includes a print job and a maintenance job.

The maintenance job includes a process of cleaning a print head performed to improve clogging of a nozzle in the printer and a process of printing a nozzle check pattern of the print head performed to check the status of the print head. Also, the maintenance job includes a process of adjusting a position of the print head performed to correct an error relative to a correct position of the print head. Also, the maintenance job includes a power supply control process of giving instructions of ON or OFF of a power supply of the printer from the client apparatus, a process of setting an operation mode of the printer, such as an operation sound mode, and a process of changing the operation mode.

A driver UI 307 is an application software (hereinafter, referred to as "application") or a utility software (hereinafter, referred to as "utility") capable of performing various settings mainly about a print job. The driver UI 307 also functions as a job output unit to issue the above-described maintenance job to the printer 309 and obtains various pieces of information about the issued job. The maintenance job issued is managed by the spooler 304. The driver UI 307 is only an example. Any application or utility can be used instead of the driver UI 307 if the application or the utility is capable of issuing a job and obtaining information about a status of the job from the spooler 304.

The application and utility are described below. The application is a defined subclass of computer software that employs the capabilities of a computer directly to a task that the user wishes to perform. The utility is a type of computer software that is designed to help manage and tune the computer hardware, operating system or application software and perform a single task or a small range of tasks.

<Relationship Among Print Queue 305, Spooler 304, and Language Monitor 308>

Now, the relationship among the above-described print queue 305, spooler 304, and language monitor 308 is described in detail. The print queue 305 contains information that can be used for displaying a status of spool data that is currently stored in the spooler 304.

The process performed after a job has been transmitted to the spooler 304 is performed as an independent process. Therefore, the process of the spooler 304 can be intentionally controlled, for example, the process of the spooler 304 can be substantially paused by not responding to the spooler 304 or by transmitting an error to the spooler 304. Accordingly, the status of the print queue 305 can be indirectly controlled by the language monitor 308.

The print queue 305 is a standard function of WINDOWS-.RTM and can be referred to by the graphic driver 303, the driver UI307, or the application 301 by using a predetermined interface function. The entity that referred to the print queue 305 can obtain information about a job that is currently managed in the print queue 305 (queue information).

Hereinafter, various processes performed in the above-described printing system are described. In an exemplary embodiment, the operations described with reference to each of the flowcharts are executed by the CPU 200 in accordance with a program stored in the ROM 201 or the HD 205.

<Process of Monitoring a Job to the End>

Figure 4:
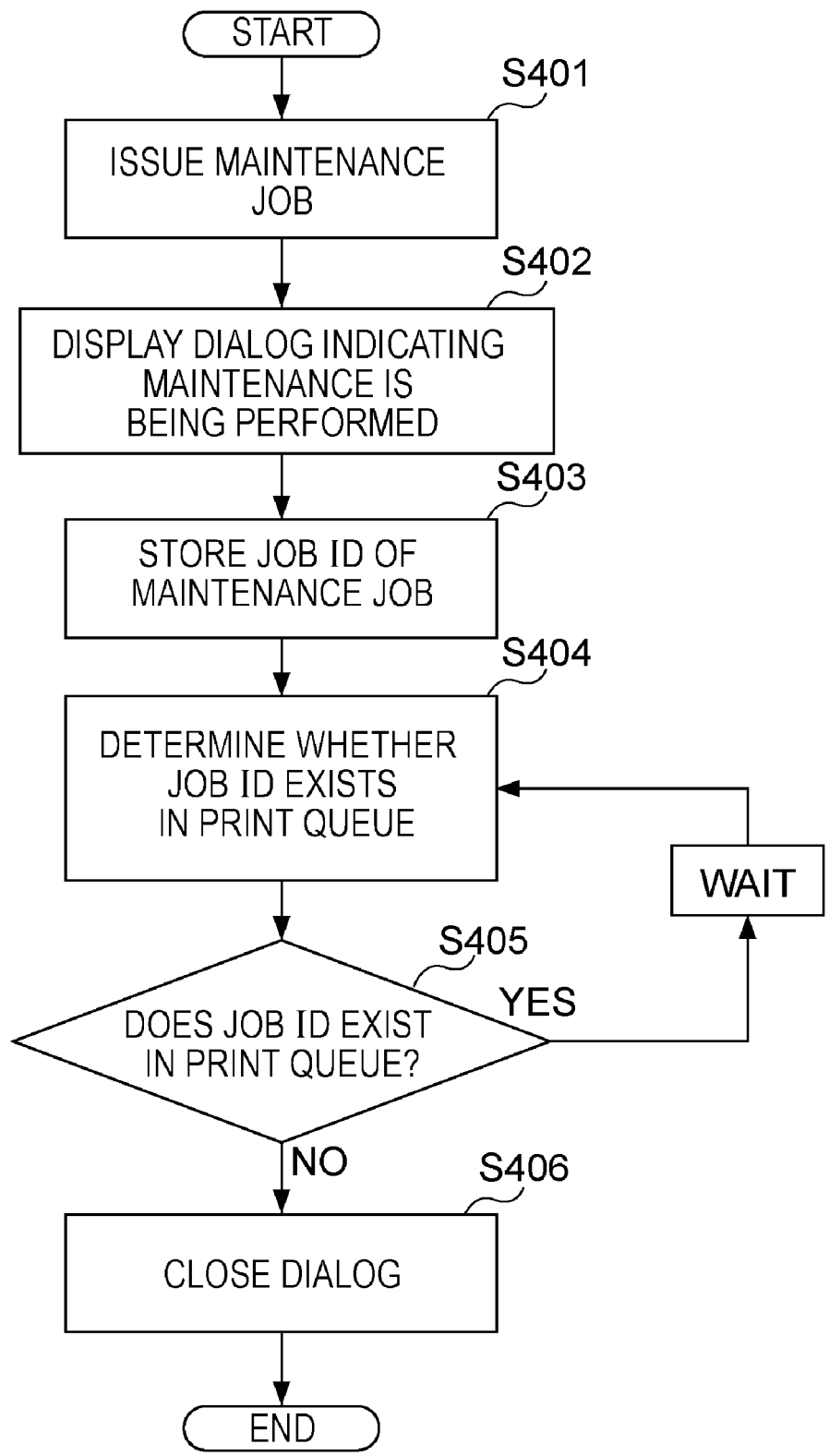
FIG. 4 is a flowchart of a process of recognizing the end of a maintenance job according to an exemplary embodiment of the present invention.

First, the respective operations of the flowchart shown in FIG. 4 are described. In the process shown in FIG. 4, the driver UI 307 issues a maintenance job and displays a dialog during the maintenance job.

Upon receiving a request to issue a maintenance job from a user, the driver UI 307 issues a maintenance job (S401).

Then, the driver UI 307 outputs instructions to display a dialog indicating that the maintenance job is being performed through the OS (S402).

Figure 5:
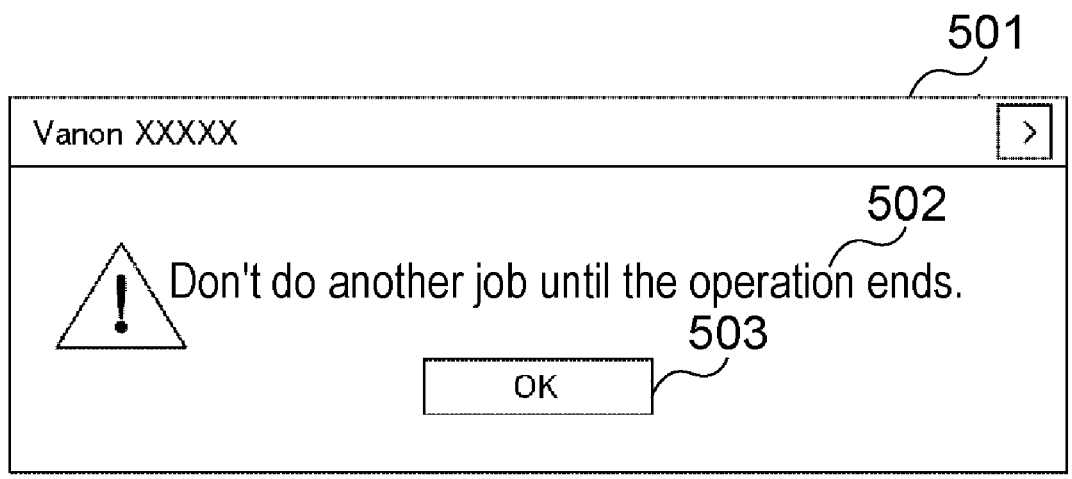
FIG. 5 shows an example of a dialog displayed while a maintenance job is being executed, according to an exemplary embodiment of the present invention.

FIG. 5 shows an exemplary dialog displayed in the display in step S402. The dialog 501 includes a message 502 indicating that maintenance is being performed and urging the user not to perform another job. The dialog 501 can be automatically closed upon the end (completion) of the maintenance job. Alternatively, the dialog 501 can be closed in accordance with a user's press on an OK button 503.

Once the maintenance job has been issued, the driver UI 307 stores a job ID of the maintenance job issued in step S401 in a storage area other than the print queue 305 (S403). A storage period of the job ID may be from an issue of the job to an end of the job. Alternatively, the job ID may be kept stored even after the job has ended in order to store the history of the job.

In an embodiment, a control process performed by the language monitor 308 on the spooler 304 enables synchronization between the end of a job in the print queue 305 and the end (completion) of an actual process performed in the printer 309. Therefore, the driver UI 307 determines whether the job ID of the maintenance job issued in step S401 exists in the print queue 305 (S404). More specifically, the driver UI 307 as an application or a utility obtains information managed by the spooler 304, serving as a job managing unit, by using a predetermined function or by referring to a predetermined storage area. Then, the driver UI 307 compares the obtained job information with the job ID stored in step S403. On the basis of step S404, the end of the maintenance job can be easily determined. The control process performed by the language monitor 308 on the spooler 304 is described below with reference to FIGS. 6 to 8.

If the job ID stored in step S403 exists in the print queue 305 (Yes in S405), the process from step S404 is repeated at predetermined intervals. Existence of the job ID in the print queue 305 indicates that the spooler 304 recognizes the job under management has not yet ended in accordance with instructions from the language monitor 308.

If the job ID stored in step S403 does not exist in the print queue 305 (No in S405), the process proceeds to step S406. Absence of the job ID in the print queue 305 indicates that the spooler 304 recognizes the job under management has ended in accordance with instructions from the language monitor 308.

In step S406, instructions about display control are given through the OS so that the dialog 501 shown in FIG. 5 is closed. In accordance with the instructions, the dialog of the maintenance job is closed at an appropriate timing.

<Detailed Description of the Language Monitor>

Hereinafter, a control process performed by the language monitor 308, serving as a monitoring unit, on the spooler 304 is described with reference to FIGS. 6 to 8. In the following description, a control process performed by the language monitor 308 on the spooler 304, that is, a process performed by the language monitor 308 of monitoring information about a job input to the printer to the end and reflecting a monitoring result to the spooler 304, is called a monitoring process.

In step S601, the process responds to a command call.

If the application 301 or the driver UI 307 outputs a command to start a job and if the language monitor 308 receives the command, initialization is performed (S602) and the process returns to the start (S603). After that, data such as actual print data or a maintenance command is output to the language monitor 308.

If the language monitor 308 receives normal data (write in S601), the language monitor 308 analyzes the received command (S604). Since a monitoring method differs depending on the type of job, the language monitor 308 determines the type of the job (S605). If there is no information about the type of the job (no in S605), the type of the job is determined on the basis of the analyzed command, and the type of the job is stored (S606).

In step S607, the language monitor 308 determines the type of the job. The type of the job determined by the language monitor 308 is one of the following three types.

One type of job is a maintenance job that is not required to be monitored to the end, that is, a maintenance job that should not be monitored to the end for a specific reason. In this case, the language monitor 308 outputs data to the printer 309 and the process returns to the start. Examples of such a maintenance job include a power supply control process of controlling ON or OFF of the power supply of the printer from the client apparatus and an operation mode setting process of setting an operation sound mode of the printer.

Another type of job is a maintenance job that is required to be monitored to the end, that is, all maintenance jobs except the maintenance jobs that are not required to be monitored to the end. Examples of such a maintenance job include a cleaning process of improving clogging of a nozzle, a process of printing a nozzle check pattern to check the status of a print head, and a process of adjusting a position of the print head performed to correct an error relative to a correct position of the print head.

The other type of job is normal printing, not a special operation performed by a command, such as maintenance. This type of job includes a print job generated by a print data output unit (e.g., the printer graphic driver 303), including rendering data such as a bitmap image, a page description language, or a markup language.

Figure 7:
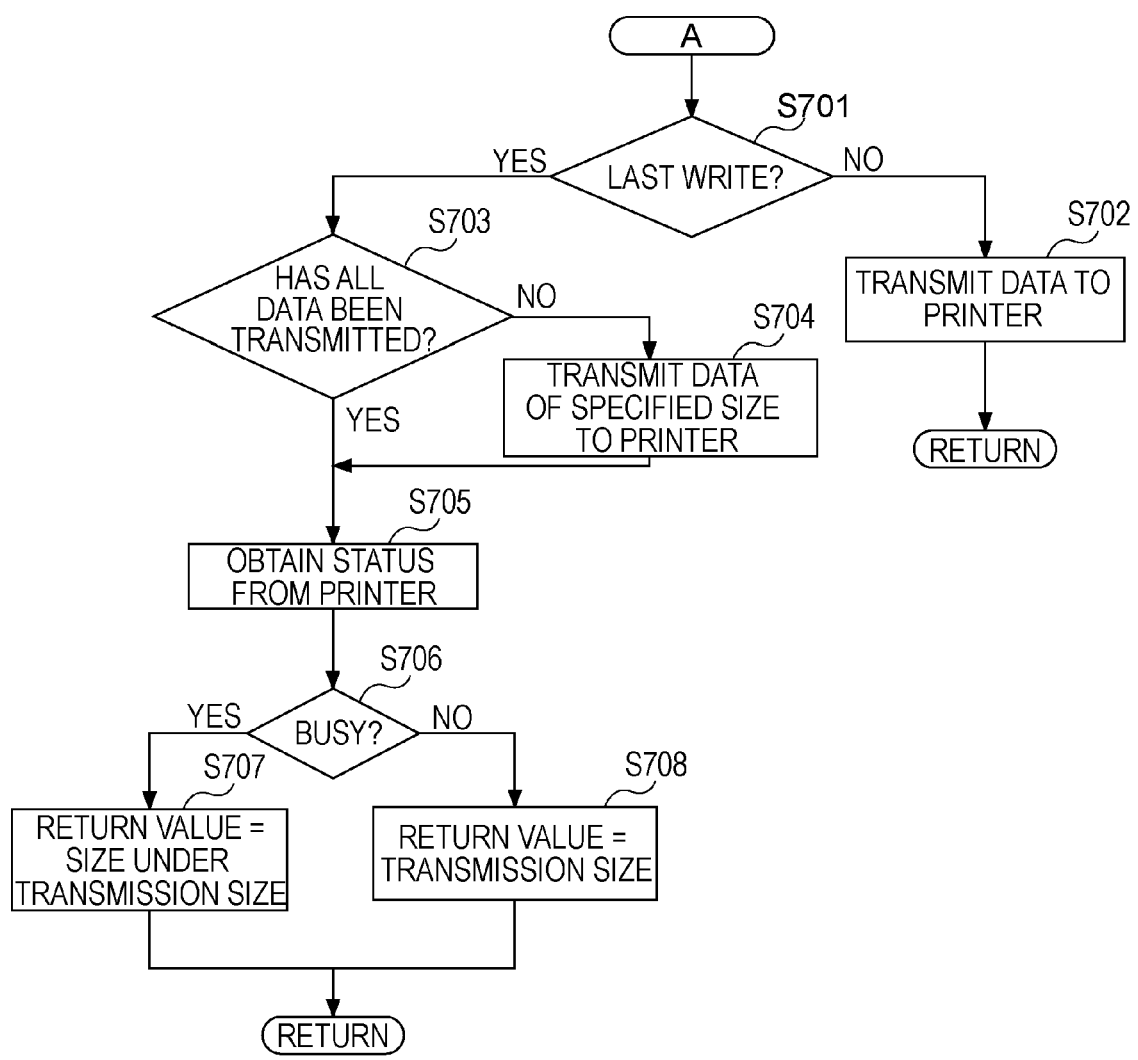
FIG. 7 is a flowchart of the job status monitoring process performed by the monitoring unit, according to the first embodiment of the present invention.

If the type of the job is determined to be a maintenance job in step S604 on the basis of the determination in step S607, the process shown in FIG. 7 corresponding to the maintenance job is performed. On the other hand, if the type of the job is determined to be a print job, the process shown in FIG. 8 corresponding to a normal print job is performed.

Hereinafter, the maintenance job requiring monitoring to the end is described with reference to FIG. 7. The language monitor 308 already analyzed the command in step S604, and thus can determine whether the command indicates the last "write" of the job (S701).

If the command is not the last "write", monitoring to the end need not yet performed, so that the data is transmitted to the printer (S702) and the process returns.

Figure 8:
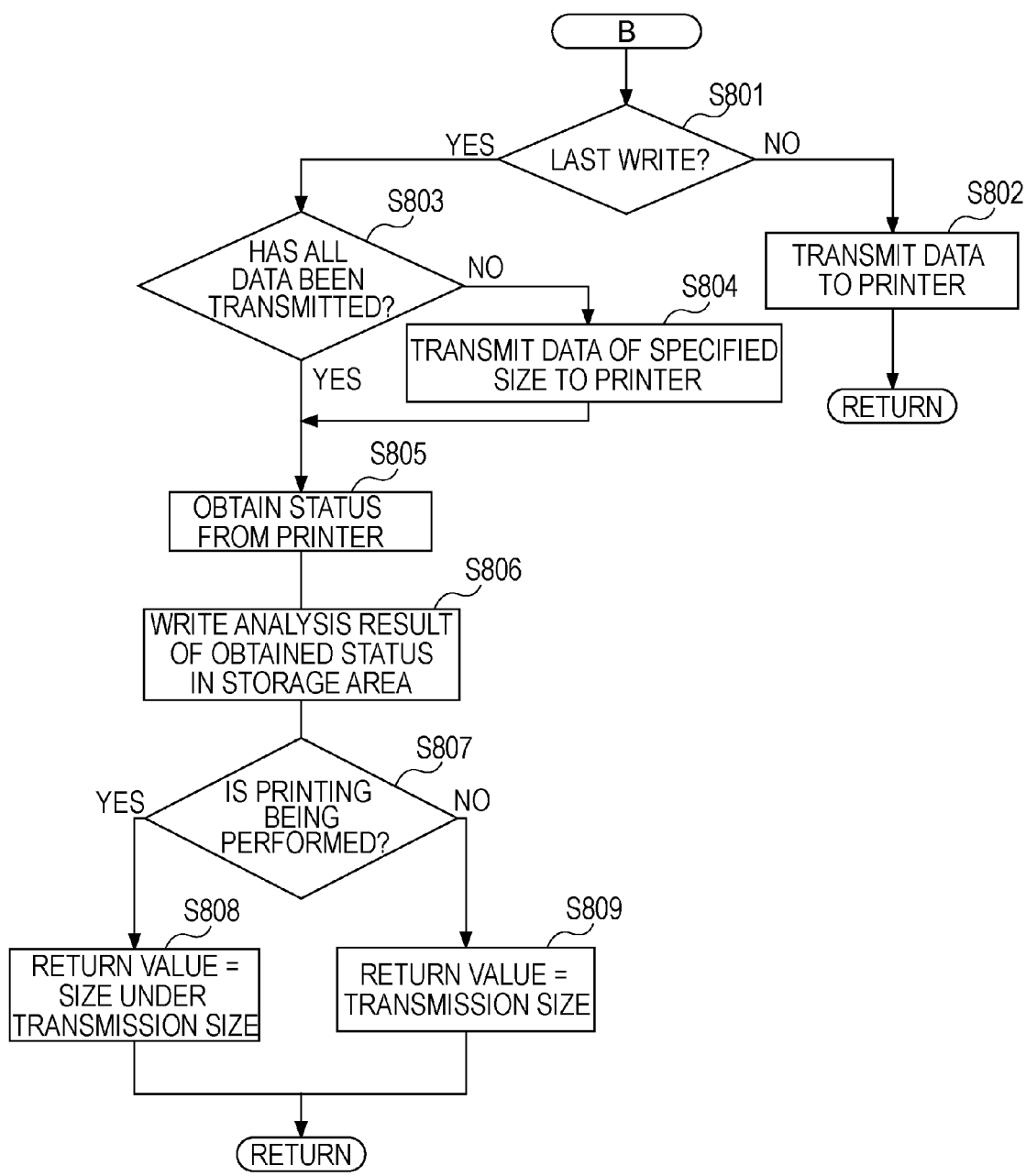
FIG. 8 is a flowchart of the job status monitoring process performed by the monitoring unit, according to the first embodiment of the present invention.

Typically, the process shown in FIGS. 7 and 8 is called a plurality of times. At the last "write", data of a specified size is output to the printer (S704). Then, a status of the job is obtained from the printer (S705) through a communication line. For example, if a busy status, indicating that the printer 309 is currently performing a process, is returned in step S706, the process proceeds to step S707 where a value of bytes smaller than a specified and written size is returned as a return value to the spooler 304. Due to the execution of step S707, the spooler 304 can determine that the job has not ended (completed) even if the job that is managed by the spooler 304 on the basis of the monitoring of the job status by the language monitor 308 has been transferred to the printer.

Normally, the return value is set to a size (byte) of data that has been normally output to the printer, so that the spooler 304 determines that data has been appropriately transmitted. In this case, however, the return value is set to a value smaller than the size of the written data, so that the spooler 304 determines that not all of the data has been normally output and re-outputs the data of the last byte that has not yet been output. If all of the data has been transmitted (Yes in S703), the language monitor 308 does not output the data to the printer but obtains and determines the status of the printer (S705).

Steps S701 to S706 are repeated. Then, if the status obtained from the printer is not busy (No in S706), the return value to the spooler 304 is set to a specified size (S708). Due to the execution of step S708, the spooler 304 can determine that all of the data has been normally output, and takes the job out of management. That is, the job itself or information about the job is deleted from the print queue 305 or is invalidated.

As described above, the process shown in FIG. 7 utilizes a mechanism of retrying a request when all of the data requested by the spooler 304 to the language monitor 308 cannot be transmitted. The language monitor 308 notifies the spooler 304 that not all of the data to be output to the printer has been output even if all of the data has been actually output, so that the spooler 304 recognizes that the job has not yet ended (completed) in a pseudo manner.

The language monitor 308 does not perform the monitoring process while not returning a process, but performs the monitoring process while returning a process to the spooler 304. Therefore, monitoring can be performed without stopping all operations of the same process.

Figure 6:
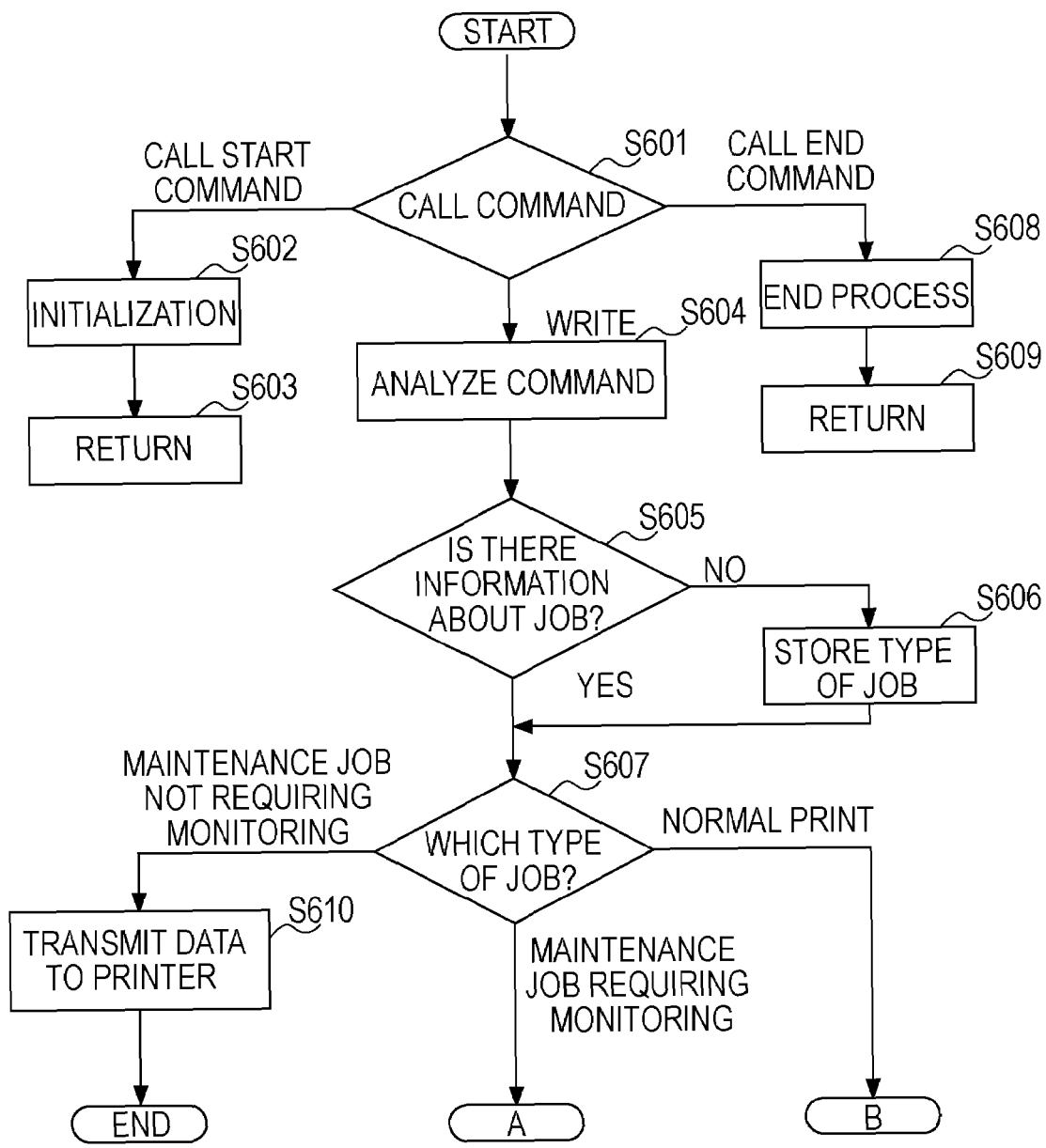
FIG. 6 is a flowchart of a job status monitoring process performed by a monitoring unit, according to a first embodiment of the present invention.

Hereinafter, a process that is performed when the type of job is determined to be normal printing in step S607 in FIG. 6 is described with reference to the flowchart shown in FIG. 8.

Steps S801 to S805 are basically the same as steps S701 to S705 shown in FIG. 7, respectively, and thus the corresponding description is not repeated.

In step S805, a status is obtained from the printer through a communication line. In step S806, the result obtained in step S805 is stored in a predetermined storage area by the language monitor 308 so that the status can be accessed by the status display application. The status display application used here may be the application 301 that requests printing or another application. If necessary, the driver UI 307 may be used as the status display application.

The stored result is read by the status display application. The status display application interprets the read result and controls display of the job status on the basis of the interpretation. At this time, the status display application needs to have a function of analyzing an output result from the language monitor 308.

In the above description, the language monitor 308 stores the analysis result of the obtained status in a predetermined area and allows the status display application to read the analysis result. However, another method can be used. For example, the language monitor 308 may respond to a request from the status display application, and the job status may be read (or forwarded) from the language monitor 308 to the status display application.

After step S806, the process proceeds to step S807 where it is determined whether printing is being performed by obtaining a status indicating the page number under printing, the status being obtained from the printer through a communication line.

In one embodiment, the status does not have a value (e.g., the value is zero) when printing is not being performed. Therefore, whether printing is being performed can be determined by referring to the status.

When the printer is allowed to execute printing of a nozzle check pattern, the following two cases are possible: a case where a pattern to be printed is held in the printer 309; and a case where the pattern to be printed is held in the printer driver or the utility and is transmitted as a print job to the printer. In the former case, instructions to print the nozzle check pattern are provided from the client side to the printer in accordance with transmission of a command, and thus the process shown in FIG. 7 is performed. In the latter case, printing of the nozzle check pattern is performed as a normal print job, and thus the process shown in FIG. 8 is performed.

In this way, since the language monitor 308 performs the monitoring process, the end of a job in the print queue 305 can be substantially synchronized with the end of the actual process in the printer 309.

Now, a process performed by the application, the utility, or the printer driver is described with reference to FIG. 9. This process is associated with the flowchart shown in FIG. 8. Hereinafter, a difference from the flowchart shown in FIG. 4 is described in detail.

In step S901, a print job is issued in accordance with a print request from the application 301. For example, the printer graphic driver 303 generates a print job.

In step S902, a dialog indicating printing is being performed is displayed in accordance with the issue of the print job.

From step S903 through step S904, the same process as that for the maintenance job is performed on the issued print job. That is, the language monitor 308 determines whether a job ID stored in step S903 is included in information about the job that is managed by the spooler 304. The correspondence between step S905 and the process shown in FIG. 8 is as follows. The determination made in step S905 is "No" if step S809 in FIG. 8 is performed by the language monitor 308. The determination made in step S905 is "Yes" if step S808 in FIG. 8 is performed by the language monitor 308.

Then, instructions to close the dialog displayed in step S902 are provided through the OS (S906).

Figure 9:
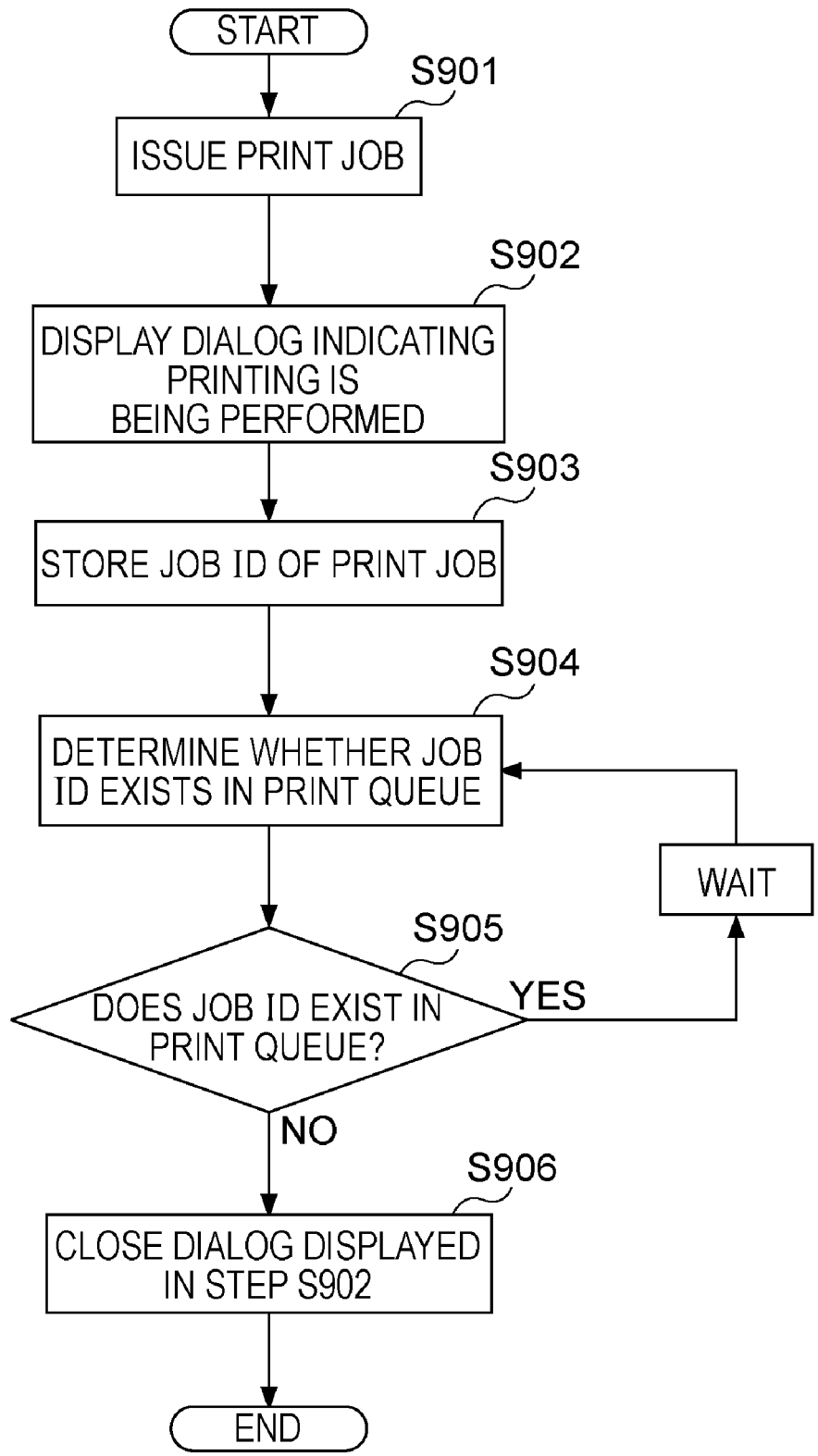
FIG. 9 is a flowchart of a process of recognizing the end of a print job, according to the first embodiment of the present invention.

In this way, the processes of the flowcharts shown in FIGS. 6, 8, and 9 are executed. The same process as that shown in FIG. 7 can be performed on not only a maintenance job but also a print job including print output. In other words, a job status can be determined by a predetermined application or utility by using a simple mechanism of determining a status of a job managed by the spooler 304. As a result, the application or the utility can appropriately determine the status of a job without directly communicating with the language monitor and can associate the determination result with display control of a message dialog.

As described above, according to the first embodiment, an upper unit (or upper module) such as the application or the utility can appropriately determine the end of an actual job by using a simple mechanism of monitoring a status of a job managed by the spooler 304.

Particularly, at issue of a maintenance job, the client apparatus outputs a maintenance command in a short time, whereas a maintenance processing status continues for a long time in the printer. That is, the timing of the end of output of a command from the client apparatus does not synchronize with the timing of the end of a maintenance process in the printer. However, in the above-described embodiment, the synchronization therebetween can be achieved. For example, time required for the maintenance process in the printer may be held in the upper unit (or upper module) side and it may be determined that the maintenance process has been done in accordance with elapse of the time. However, a status of a job can be monitored more accurately by using the above-described mechanism.

Furthermore, the upper unit (or upper module) side can monitor a status of a job without considering output specifications of a monitoring unit such as the language monitor. Accordingly, analysis of an output result generated by the monitoring unit can be simplified and development of the upper unit (or upper module) can be easily performed.

Second Exemplary Embodiment

The above-described first embodiment is based on the assumption that the client apparatus and the printer can perform two-way communication by the language monitor. However, some types of communication interface of the client apparatus and the printer do not support the two-way communication. Even if the communication interface supports two-way communication, the communication between the client side and the printer side may be limited to one-way communication from the client side to the printer side, e.g., two-way communication may be prohibited by the setting of the OS or the printer may be connected to a specific print server.

If two-way communication cannot be performed, the client apparatus cannot obtain information about various statuses from the printer. In a mechanism according to the second embodiment, the application can easily and appropriately monitor a status of a job even if two-way communication cannot be performed.

Figure 10:
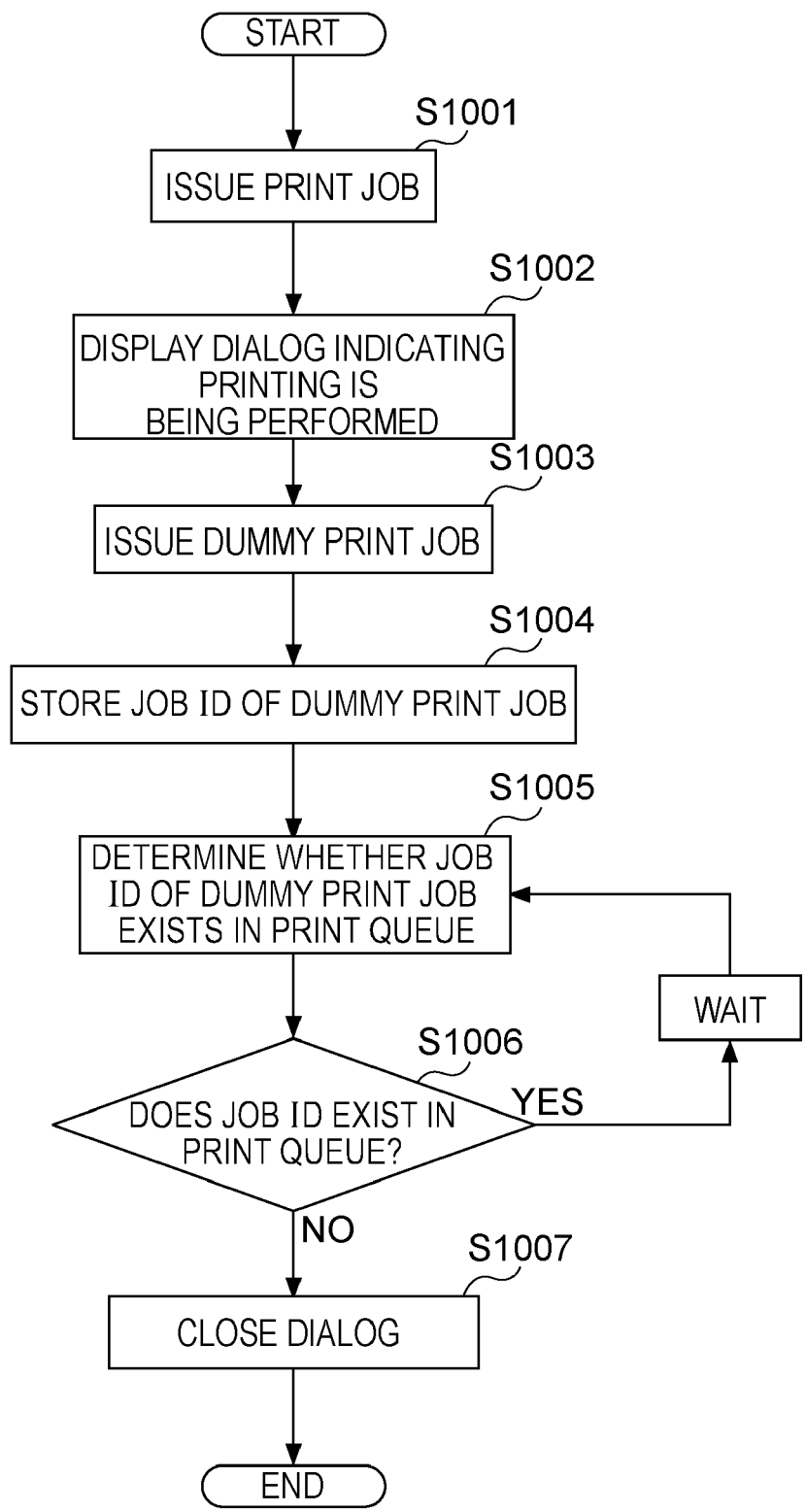
FIG. 10 is a flowchart of a process of recognizing the end of a job using a dummy print job, according to a second embodiment of the present invention.

FIG. 10 shows a process of issuing a job and detecting the end of the job, according to a second embodiment of the present invention. The process is performed by a upper unit (or upper module) such as an application or a utility. The flowchart shown in FIG. 10 can be applied to the maintenance job described in the first embodiment. However, a print job is performed here. An application is used as the upper unit (or upper module).

First, the upper unit (or upper module) issues a print job (S1001).

Figure 11:
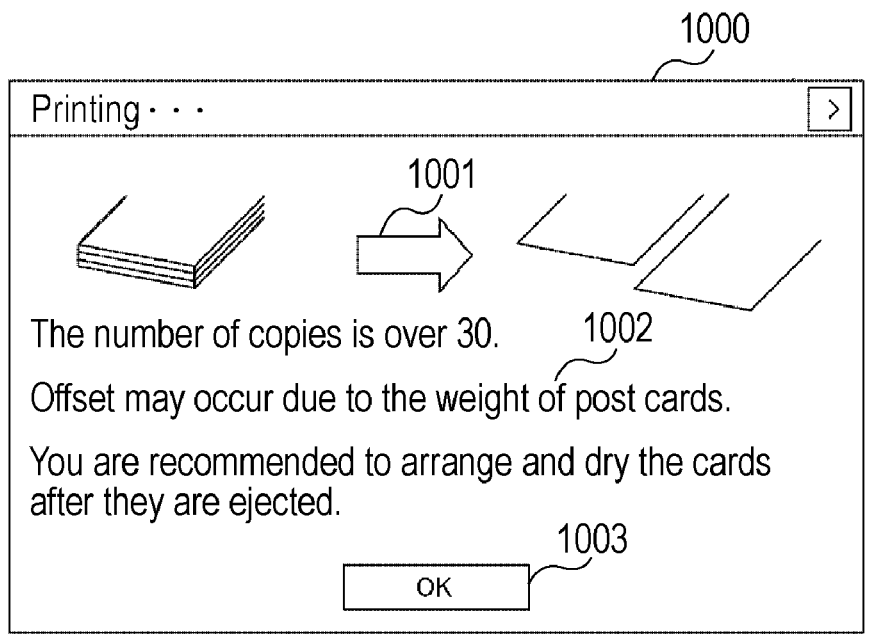
FIG. 11 shows an example of a dialog displayed while a job is being executed, according to an embodiment of the present invention.

Then, the application independently displays a dialog indicating printing is being performed (S1002). FIG. 11 shows an example of a dialog displayed while a print job is being performed, according to an embodiment of the present invention. FIG. 11 shows a message for user's recommendable operation. 1001 shows user the message by picture and 1002 shows user the message by text. If a designation is made by user to the button of 1003, the dialog of FIG. 11 is eliminated. Then, the application issues a dummy print job for detecting the end of the print job issued in step S1001, the dummy print job not being processed by the printer (S1003).

The dummy print job issued in step S1003 is automatically issued regardless of a user's intention every time printing is performed. Note that, because the dummy print job is not processed by the printer, the dummy print job has no effect on a previously issued print output process and can be abandoned by the printer as necessary.

The application stores a job ID of the dummy print job issued in step S1003 (S1004). Of course, the job ID of the dummy print job is also managed by the spooler 304.

Note that, the printer 309 has a function of not accepting a next print job while it is processing a print job. More specifically, the printer keeps the status of the interface thereof busy even after receiving all print data of a print job. After the entire printing process has completed, the printer cancels the busy status and receives next data. Thus, the printer 309 accepts the dummy print job issued in step S1003 after completing the print job issued in step S1001.

Then, the application checks the print queue 305 of the OS at predetermined intervals and determines whether the job ID stored in step S1004 exists in the print queue 305 (S1005).

If it is determined in step S1006 that the job ID exists in the print queue 305, the application determines that the job issued in step S1001 has completed. In accordance with the determination, the application closes the dialog displayed in step S1002 (S1007).

The dummy print job issued in step S1003 is not printed out by the printer 309, and thus the process thereof ends soon after the printer 309 receives it.

Accordingly, the end of the dummy print job issued in step S1003 substantially synchronizes with the end of the job issued in step S1001.

Third Exemplary Embodiment

According to a third embodiment, a job status is monitored with a mechanism that is more developed compared to that of the second embodiment.

For example, assume that the printer 309 is used as a network printer and that the printer 309 can be referred to by a plurality of PCs. In this case, it is not ensured that the dummy print job issued in step S1003 comes next to the job issued in step S1001 in the print queue 305. In other words, the dummy print job may be interrupted by another job or another job may be preferentially performed.

In that case, the end of the dummy print job issued in step S1003 cannot appropriately be detected. For example, the end of the dummy print job may be detected sometime after the print job issued in step S1001 has actually completed. This problem is solved in the third embodiment.

Figure 12:
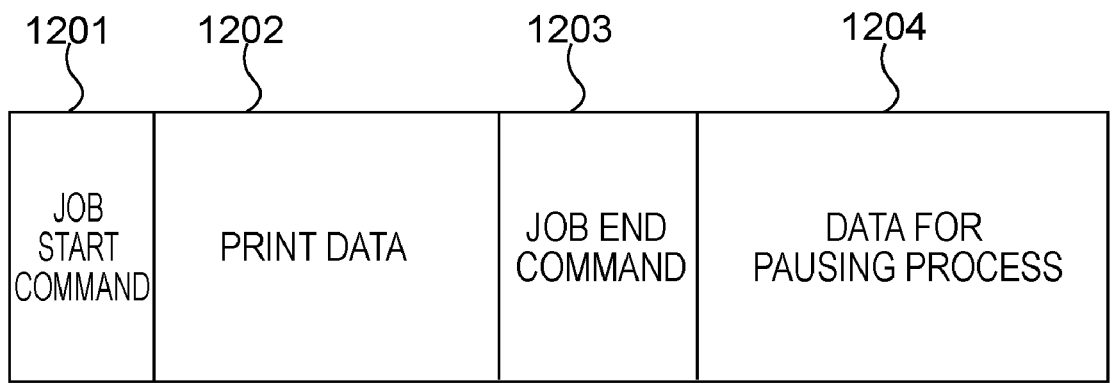
FIG. 12 shows an example of a job attached with a dummy portion that is output from an output unit, according to a third embodiment of the present invention.
Figure 13:
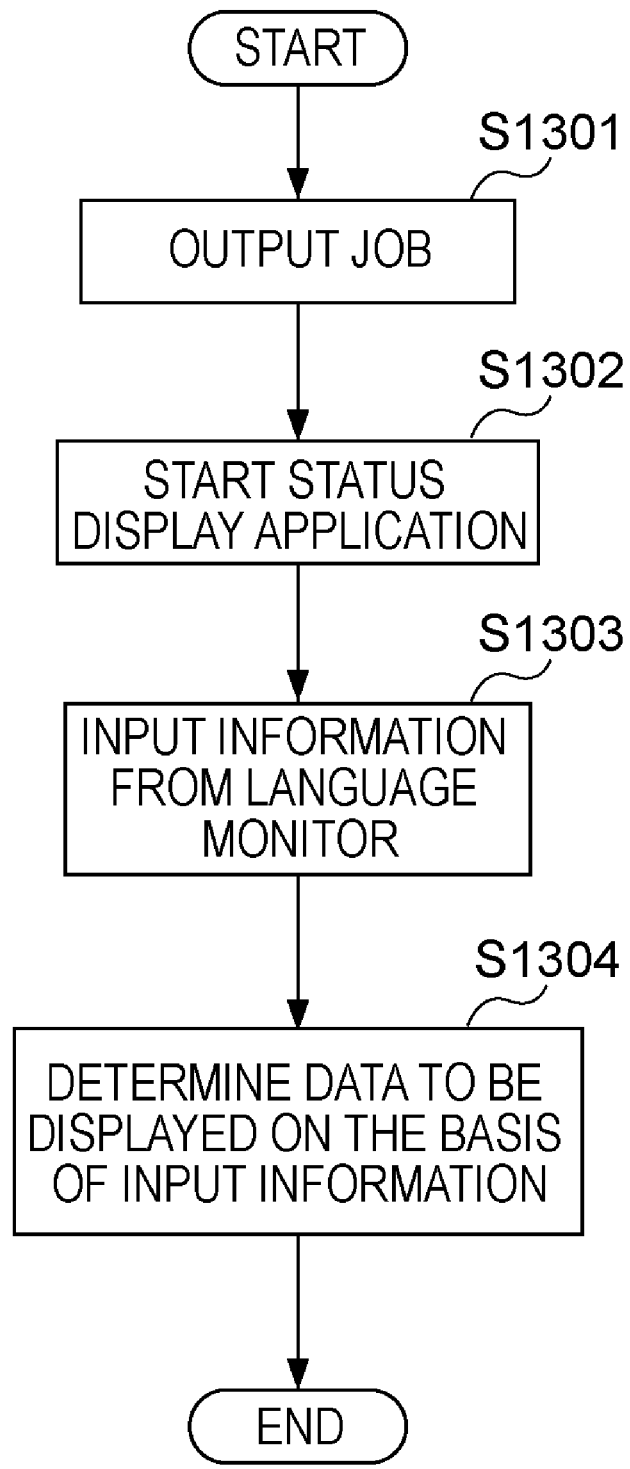
FIG. 13 is a flowchart showing a conventional job monitoring process.

FIG. 12 shows an example of job data transmitted according to the third embodiment of the present invention. The job data shown in FIG. 12 includes a job start command 1201, print data 1202, a job end command 1203, and data 1204 that has a size larger than the size of a buffer of the printer 309 and that is not printed by the printer 309.

The print job shown in FIG. 12 is generated by the graphic driver 303 without specification by the application 301 when printing is requested through the application 301.

The print job shown in FIG. 12 is identified as a single job by the OS. Thus, another print job does not interpose between the job end command 1203 and the data 1204, so that the problem occurred in the second embodiment can be solved.

The printer 309 analyzes data output from the client apparatus and then performs a printing process or the like. When the job end command 1203 is detected, the printer 309 pauses the data receiving process. The data receiving process is paused by setting the status of the interface of the printer to busy so that data output from the language monitor 308 is not accepted. Alternatively, the process can be paused by pausing a process of analyzing the data.

In the example shown in FIG. 12, the data 1204, whose size is larger than that of the buffer of the printer 309, exists after the job end command 1203. Therefore, the print queue 305 indicates a status where data transmission has not completed.

Upon completion of an actual printing process of the previously received print job (1201 to 1203), the printer 309 restarts the data receiving process and also restarts analyzing data. The data 1204 that is analyzed by the printer 309 does not affect print output. Therefore, the processing time is much shorter than that of the print output process. After the process on the data 1201 to 1204 has completed, information about the issued print job is deleted from the print queue 305.

Accordingly, the application or the utility can monitor the status of the job shown in FIG. 12 by using a simple mechanism of monitoring information about a job managed by the spooler 304. Further, according to the mechanism described in the third embodiment, even if the communication between the language monitor 308 and the printer 309 is performed in one-way, the end of a job in the print queue 305 and the end of an actual printing process in the printer 309 can be substantially synchronized with each other.

Furthermore, a maintenance job can also be applied to the third embodiment by replacing the print data 1202 with a maintenance command.

Fourth Exemplary Embodiment

In the above-described first to third embodiments, a job status monitoring system in which respective software modules installed in the client apparatus cooperate with each other and a job status monitoring method have been described. These system and method can be modified.

For example, the job status monitoring system may be configured by installing the language monitor 308 shown in FIG. 3 into another computer. In that case, the language monitor 308 and the spooler 304 perform inter-process communication, so that the same effect as that in the above-described embodiments can be obtained.

In FIG. 3, the respective software modules including the language monitor 308 and the spooler 304 are separated from each other. Alternatively, the job status monitoring system can be configured by a single software module realized by one process.

As described above, according to the embodiments of the present invention, a job status monitoring system can be established in various forms depending on the system environment of a user.

Other Embodiments

The embodiments of the present invention can be realized by providing a storage medium storing program code to realize functions of each embodiment to a system or an apparatus and allowing a computer (CPU or MPU) of the system or the apparatus to read and execute the program code stored in the storage medium. In that case, the program code read from the storage medium realizes the functions of the above-described embodiments, and thus the storage medium storing the program code is included in the present invention. Examples of the storage medium to supply the program code include a floppy disk, a hard disk, an optical disc, a magneto-optical disc, a CD-ROM, a CD-R, a magnetic tape, a nonvolatile memory card, and a ROM.

The functions of the above-described embodiments may be realized when the computer executes the read program code. Alternatively, the functions of the above-described embodiments may be realized when an OS or the like operating on the computer executes part or all of actual processing on the basis of instructions of the program code.

Alternatively, after the program code read from the storage medium has been written in a memory provided in a function expanding board inserted into the computer or a function expanding unit connected to the computer, a CPU or the like provided in the function expanding board or the function expanding unit may execute part or all of actual processing on the basis of the instructions of the program code, so that the functions of the above-described embodiments may be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-188290 filed Jun. 28, 2005, which is hereby incorporated by reference herein in its entirety.

What is claimed is:

1. A job status monitoring system capable of communicating with a printer, the job status monitoring system comprising:
   a job output unit configured to output a job to a spooler of an operating system, the job being issued in response to a job issue request; and
   a monitoring unit configured to monitor a status of the job output from the spooler to the printer, the status including the status indicating that the job is completed in the printer,
   wherein the monitoring unit notifies the spooler that a job transfer to the printer is not completed when the job is not completed by the printer even if the job transfer is completed and that the job transfer to the printer is completed when the job is completed by the printer, such that the spooler manages the job as the job transfer to the printer is not completed until the monitoring unit detects that the job is completed by the printer, and
   wherein an application or utility recognizes the status of the job in the printer by checking transferring status of the job in the spooler; and
   wherein the monitoring unit notifies the spooler that data having a size smaller than data which is really transferred to the printer is transferred, when the job is not completed by the printer even if the job transfer is completed.

2. The job status monitoring system according to claim 1, wherein the monitoring unit notifies the spooler that the job transfer to the printer is completed when the monitoring unit detects that the printer is not in busy status.

3. The job status monitoring system according to claim 1, wherein the job comprises a maintenance job.

4. The job status monitoring system according to claim 3, wherein the maintenance job includes any of instructions to clean a print head of the printer, instructions to print a nozzle check pattern of the print head, instructions to adjust a position of the print head.

5. The job status monitoring system according to claim 1, wherein the monitoring unit comprises a language monitor.

6. A method for monitoring a job status associated with a printer, the method comprising:
   outputting a job to a spooler of an operating system having a job managing unit, the job being issued in response to a job issue request;
   monitoring the job status from the spooler to the printer, the status including the status indicating that the job is completed in the printer; and
   notifying the spooler that a job transfer to the printer is not completed when the job is not completed by the printer even if the job transfer is completed and that the job transfer to the printer is completed when the job is completed by the printer, such that the spooler manacles the job as the job transfer to the printer is not completed until the monitoring unit detects that the job is completed by the printer, and
   wherein an application or utility recognizes the status of the job in the printer by checking transferring status of the job in the spooler; and
   wherein the spooler is notified that data having a size smaller than data which is really transferred to the printer is transferred, when the job is not completed by the printer even if the job transfer is completed.

7. The method according to claim 6, wherein the spooler is notified that the job transfer to the printer is completed when the printer is not in busy status.

8. The method according to claim 6, wherein the job comprises a maintenance job.

9. The method according to claim 8, wherein the maintenance job includes any of instructions to clean a print head of the printer, instructions to print a nozzle check pattern of the print head, instructions to adjust a position of the print head.

10. A computer-readable medium having stored thereon instructions which, when executed by a computer, causes the computer to perform a method comprising:
   outputting a job to a spooler of an operating system having a job managing unit, the job being issued in response to a job issue request;
   monitoring a job status from the spooler to the printer, the status including the status indicating that the job is completed in the printer; and
   notifying the spooler that a job transfer to the printer is not completed when the job is not completed by the printer even if the job transfer is completed and that the job transfer to the printer is completed when the job is completed by the printer, such that the spooler manages the job as the job transfer to the printer is not completed until the monitoring unit detects that the job is completed by the printer, and wherein an application or utility recognizes the status of the job in the printer by checking transferring status of the job in the spooler; and wherein the spooler is notified that data having a size smaller than data which is really transferred to the printer is transferred, when the job is not completed by the printer even if the job transfer is completed.

11. The computer-readable medium according to claim 10, wherein the spooler is notified that the job transfer to the printer is completed when the printer is not in busy status.

12. The computer-readable medium according to claim 10, wherein the job comprises a maintenance job.

13. The computer-readable medium according to claim 12, wherein the maintenance job includes any of instructions to clean a print head of the printer, instructions to print a nozzle check pattern of the print head, instructions to adjust a position of the print head.

* * * * *